United States Patent [19]
Cherny

[11] Patent Number: 5,631,414
[45] Date of Patent: May 20, 1997

[54] METHOD AND DEVICE FOR REMOTE DIAGNOSTICS OF OCEAN-ATMOSPHERE SYSTEM STATE

[76] Inventor: Igor V. Cherny, ul.Ramenki,d.25,korp.4,kv.1009, 117607 Moscow, Russian Federation

[21] Appl. No.: 287,847

[22] Filed: Aug. 9, 1994

[30] Foreign Application Priority Data

Aug. 18, 1993 [RU] Russian Federation ............ 93041426

[51] Int. Cl.$^6$ .................................................. G01W 1/00
[52] U.S. Cl. ........................................ 73/170.27; 324/640
[58] Field of Search ............................ 73/170.27, 29.01; 324/640; 374/120, 121, 122, 136

[56] References Cited

U.S. PATENT DOCUMENTS

| | | | |
|---|---|---|---|
| 3,098,380 | 7/1963 | Suomi et al. | 73/170.27 |
| 3,380,055 | 4/1968 | Fow et al. | 343/100 |
| 3,911,435 | 10/1975 | Mardon et al. | 324/7 |
| 4,178,100 | 12/1979 | Levis | 356/216 |
| 4,873,481 | 10/1989 | Nelson et al. | 324/640 |
| 5,065,615 | 11/1991 | Hill | 324/640 X |
| 5,149,198 | 9/1992 | Sterzer | 374/139 |
| 5,526,676 | 6/1996 | Solheim et al. | 73/170.27 X |

OTHER PUBLICATIONS

The Seasat Scanning . . . , IEEE Journal of Oceanic Engineering, vol. OE–5, No. 2, 1980, pp. 100–115.

SSM/I Instrument Evaluation, IEEE Transactions on GIO–Science and Remote Sensing, vol. 28, No. 5, 1990, pp. 781–790.

*Primary Examiner*—Elizabeth L. Dougherty
*Attorney, Agent, or Firm*—Collard & Roe, P.C.

[57] ABSTRACT

A method for remote diagnostic of ocean-atmosphere system state consisting in the measurement of upwelling microwave radiation of ocean-atmosphere system in the range, approximately, from 20 to 100 GHz at viewing angles with respect to the ocean surface ranges, approximately, from 60° to 80°, is discussed. A device for remote diagnostic of ocean-atmosphere system state contains a receiving antenna to which the radiometers are connected and tuned to operating frequencies in the range, approximately, from 20 to 100 GHz, whereby the brightness temperature of upwelling microwave radiation of ocean-atmosphere system is measured. The microwave data obtain by this means are analyzed for the presence of specific spectral and polarization brightness temperature variations, by which it is judged about ocean-atmosphere system state.

11 Claims, 3 Drawing Sheets

METHOD AND DEVICE FOR REMOTE DIAGNOSTICS OF OCEAN-ATMOSPHERE SYSTEM STATE

FIELD OF THE INVENTION

The present invention relates to the field of meteorology and in particular to remote sensing of the ocean-atmosphere system namely: to the method for remote diagnostic of the ocean-atmosphere system state and to device of its realization and can be used in global aerospace monitoring for solving various geophysical problems, for instance, in the diagnostics of the inner oceanic processes and critical situations in the atmosphere such as tropical cyclones.

BACKGROUND OF THE INVENTION

At present time the basic means for global monitoring of the Earth climate and its anomalies are represented by satellite method. The main goal is to create the space technique for remote sensing of the Earth, capable of providing the corresponding data for a long-term weather forecast and early predicting the natural catastrophes such as typhoons and hurricanes, floods, drought, crop deplete and etc. In this respect rather important role belongs to the microwave means both active and passive. Existing methods of passive microwave remote sensing of the ocean-atmosphere system make it possible to remotely determine important meteorological parameters of atmosphere and ocean surface.

In this connection, measurements of upwelling microwave radiation of ocean-atmosphere system taken near the lines of molecular absorption of oxygen (60 and 118,75 GHz) and water vapor (22.235 and 183 GHz), and also in the transparent atmosphere windows (near 37 and 90 GHz) make it possible to determine such parameters of the ocean surface as its temperature, near surface wind speed, to retrieve the altitude profiles of atmosphere temperature and humidity, and also to determine the total precipitable water in the atmosphere, cloud liquid water content, precipitation, and so on.

The mentioned above bands of frequencies are used in the existing aerospace methods for remote sensing of ocean-atmosphere system mainly for determining hydrometeorological parameters of the atmosphere and ocean surface.

Nevertheless, all the processes taking place on the ocean surface are related in one or another way to the state of the deep water layers, even if the surface phenomena occur under direct atmospheric influence. It is valid mostly for anomalous state of the surface.

Presently, a most important problem is to develop aerospace observing method which could "look into" the ocean depths through the surface to provide information on the inner oceanic processes, controlling the weather anomalies and climate changes.

STATEMENT OF PRIOR ART

There is known a series of methods for remote sensing of the ocean-atmosphere system based on measuring of upwelling microwave radiation of ocean-atmosphere system by which the hydrometeorological parameters of the atmosphere and ocean surface are determined with the aid of, for instance, a Scanning Multichannel Microwave Radiometer (SMMR), which was installed on U.S.A. satellites "Seasat" and "Numbus-7" (see for example, E. G. Njoku, J. M. Stacey and F. T. Barath, The Seasat Scanning Multichannel Microwave Radiometer (SMMR): Instrument Description and Performance. IEEE Journal of Oceanic Engineering, Vol. OE-5, No.2, 1980, pp. 100–115).

The said method is based on measuring of upwelling microwave radiation of ocean-atmosphere system at the following frequencies: 6.63; 10.69; 18.0; 21.0 and 37.0 GHz. The viewing angle with respect to the ocean surface was equal to 49°.

There is also known a device for realization of the said method. The device comprises a receiving antenna with radiometers connected to it and tuned to fixed operating frequencies of 6.63; 10.69; 18.0; 21.0 and 37.0 GHz and registering system.

The said method and device make it possible to determine the sea surface temperature, wind speed over ocean, total precipitable water in the atmosphere and cloud liquid water content.

However, the given method and device to not allow even approximately to judge about processes occurring in the active ocean layer, for instance, such as currents, synoptic eddies, distribution of thermohaline fine structure of the ocean, etc.

At present time, there is the method for remote sensing of the ocean-atmosphere system based on Special Sensor Microwave/Imager (SSM/I) of Defense Meteorological Satellite Program, U.S.A. (see, for instance, J. P. Hollinger, J. L. Peirce and G. A. Poe, SSM/I Instrument Evaluation. IEEE Transactions on Geoscience and Remote Sensing. Vol.28, No.5, 1990, pp.781–790).

The said method is also based on measuring of upwelling microwave radiation of ocean-atmosphere system. The measurements are carried out at the following frequencies: 19.35, 22.235, 37.0 and 85.5 GHz. The angle of beam incidence with respect to the ocean surface is equal to 53.1°.

The described method solves similar problems pertaining to the determination of the sea surface temperature, wind speed over ocean, total precipitable water in the atmosphere and cloud liquid water content.

There is also known a device for realization of the said method. The device comprises a receiving antenna with radiometers connected to it and tuned to four operating frequencies of 19.35, 22.235, 37.0 and 85.5 GHz and registering system SSM/I has higher spatial resolution and greater swath width than the SMMR.

SUMMARY OF THE INVENTION

The main object of this invention is to creation a method for remote diagnostics of the ocean-atmosphere system, which could provide the reliable information on processes taking place in the active ocean layer and producing the decisive influence on the ocean-atmosphere system state.

The next important object of this invention is to creation a method for remote diagnostics of the ocean-atmosphere system, which could provide the reliable information on impending development of critical situations in the atmosphere such as typhoons and hurricanes.

The following object of this invention is to creation a method for remote diagnostics of the ocean-atmosphere system, which could provide the reliable information on the ocean-atmosphere system state the most promptly up to the real time mode.

The important object of this invention is to creation a relatively simple and reliable device for remote diagnostics of the ocean-atmosphere system, providing the maximum reliable information on the ocean-atmosphere system state, available from no other means.

Once more important object of this invention is to creation a device for remote diagnostics of the ocean-atmosphere system, which could have small sizes and weight, as well as, the possibility of farther miniaturization.

Also the important object of this invention is to creation a relatively cheap device for remote diagnostics of the ocean-atmosphere system.

In accordance with mentioned above and other objects, the principle of the invention is to carry out the multispectral measurements of brightness temperature of upwelling microwave radiation of the ocean-atmosphere system at frequencies in the range, approximately, from 20 to 100 GHz. The microwave radiation is measured at two orthogonal plarizations for each operating frequency. Aerospace remote sensing of ocean-atmosphere system are made so that the viewing angle with respect to the ocean surface ranges, approximately, from 60° to 80°. The microwave data obtained by this means are analyzed for the presence of specific spectral and plarization brightness temperature variations. With the availablility of cited above brightness temperature variations, the spatial regions of anomalous phenomena are classified on the ocean surface.

In turn, that makes it possible to detect the following processes in the ocean-atmosphere system: early diagnostics of the location of tropical cyclones origination; early diagnostics of anomalous trajectory of typhoons or hurricanes motion; diagnostics of currents and synoptic eddies in the oceans, including the deep eddies; diagnostics of frontal zones and thermal inhomogeneities of the upper ocean layer, having importance for fishery; diagnostics of anomalous phenomena in the ocean like El-Nino, influencing on global weather and climate changes.

BRIEF DESCRIPTION OF THE DRAWINGS

The said invention thereafter is explained by description of concrete examples for it realization and attached drawing, for which.

DETAILED DESCRIPTION OF THE PREFERRED EMBODIMENTS

The claimed method for remote diagnostics of the ocean-atmosphere system state (FIG. 1) is as follows.

The upwelling microwave radiation of ocean-atmosphere system is measured at frequencies in the range, approximately, from 20 to 100 GHz. The upwelling microwave radiation of ocean-atmosphere system is simultaneously measured at least two operating frequencies. The spectral interval between the operating frequencies ranges, approximately, from 5 to 30% of operating frequency value. The microwave radiation is measured at two orthogonal plarizations for each operating frequency. The measurements can be carried out from aboard of ship, aircraft and satellite. As this takes place, the remote sensing is made at grazing angles, to say, so that the viewing angle with respect to the ocean surface ranges, approximately, from 60° to 80°.

Figure 1:
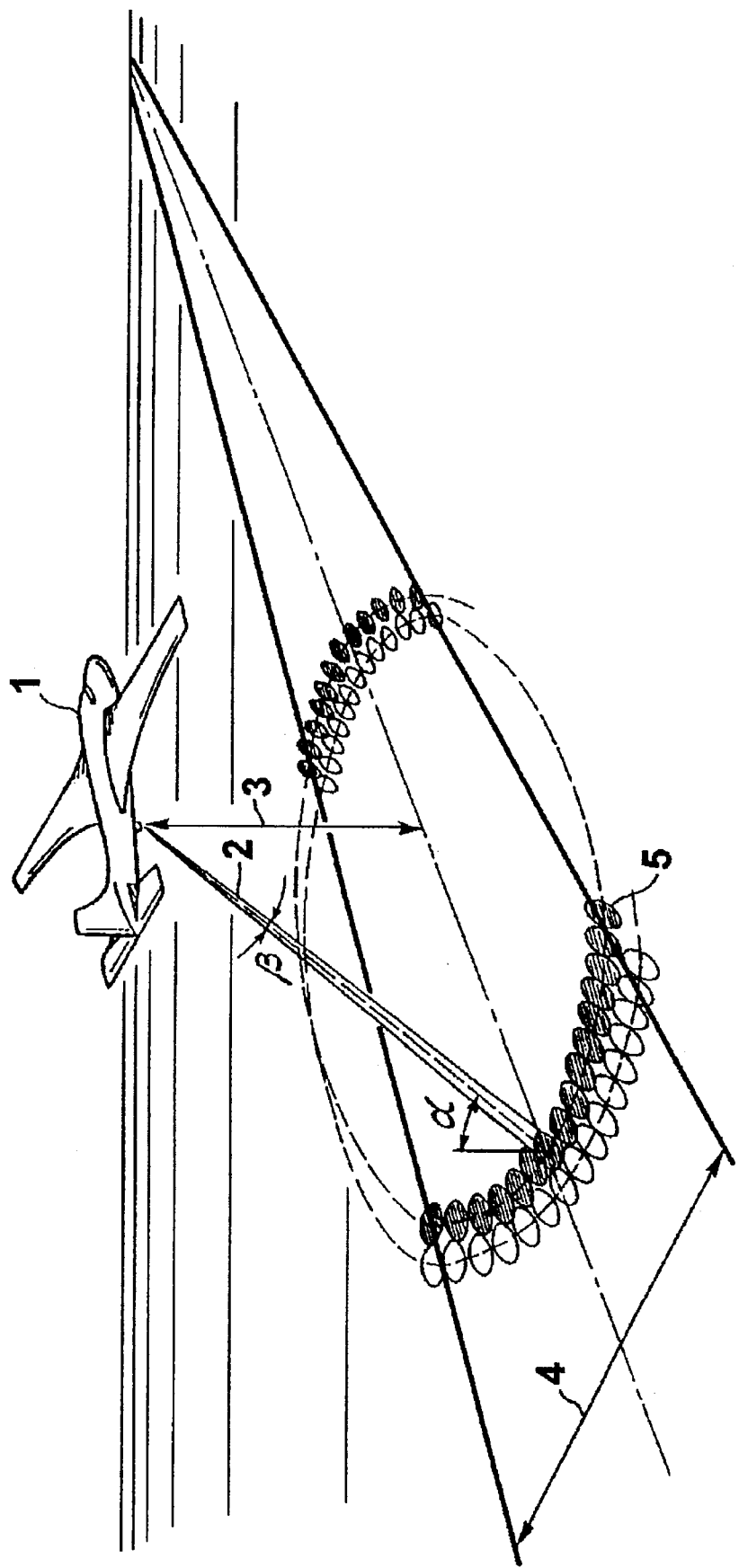
FIG. 1.—shows the airborne imaging technique configuration in measuring the upwelling microwave radiation of ocean-atmosphere system, according to subject invention.

FIG. 1 shows the concrete example of microwave imaging technique configuration from aircraft 1. The way of getting image of the underlaying surface is based on mechanical scanning by the antenna beam 2 from the height 3 in swath width 4 with regard to the aircraft motion. Viewing angle $\alpha$ is an angle of antenna beam incidence with respect to the ocean surface. The image consists of pixels, which correspond to the spatial resolution, defined by foot print 5. The size of foot print is determined by the angle $\beta$, which characterizes the width of antenna beam 2.

The data obtained by this means in form of brightness temperature of upwelling microwave radiation of ocean-atmosphere system are analyzed for the presence of specific spectral and polarization brightness temperature variations, which characterize the anomalous process in the ocean-atmosphere system. This could be reflected in the fact that both brightness temperature variations appear at one operating frequency in the absence of indicated variations at another operating frequency, or brightness temperature increasing takes place at one operating frequency concurrently with the decreasing of brightness temperature at another operating frequency. In addition, brightness temperature variations could appear at one polarization in the absence of said variations at another polarization, or brightness temperature increasing could take place at one polarization concurrently with the decreasing of brightness temperature at another polarization, for the same operating frequency. In the case that brightness temperature increasing or decreasing are observed on currently at all operating frequencies and polarizations, or brightness temperature variations are entirely absent, the ocean-atmosphere system state is classified as common one.

Figure 2:
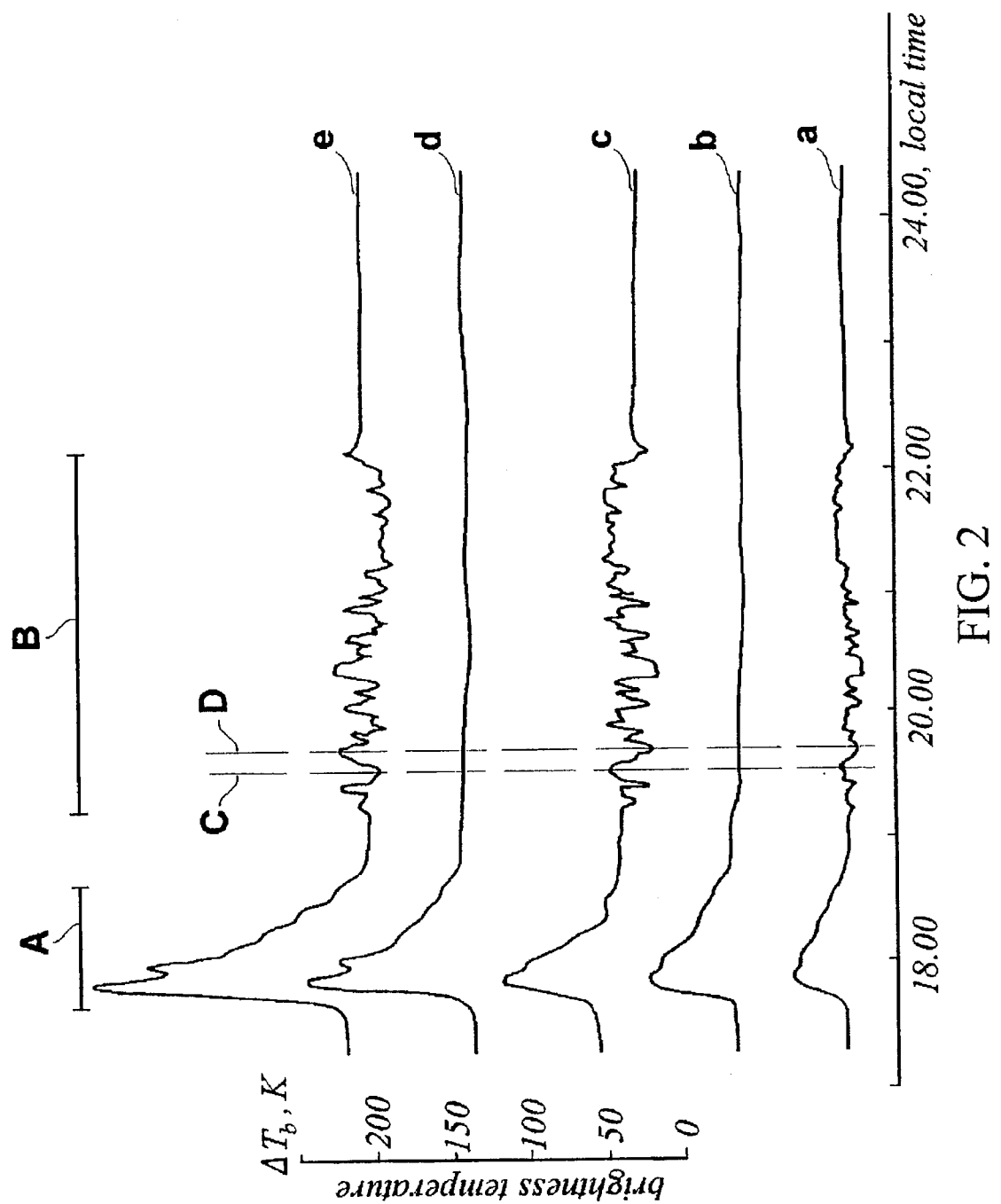
FIG. 2.—shows the specific experimental result on remote diagnostics of the anomalous state of the ocean surface, known in oceanography as "relic rain". Brightness temperature variations due to the rain (A) and "relic rain" (B) at frequencies of: a—48.0 GHz, b—37.5 GHz, c—34.5 GHz (vertical polarization) and d—48.0 GHz, e—34.5 GHz (horizontal polarization), according to subject invention.

FIG. 2 shows the concrete experimental result of remote diagnostics of anomalous phenomenon on the ocean surface, caused by short period tropical shower, obtained by means of claimed method. In oceanography this phenomenon is called a "relic rain".

It is known the precipitation changes the temperature and salinity of sub-surface ocean layer. The interesting consequence of rain is the "relic rain". It is the small scale temperature or salinity fluctuations in sub-surface water layer of 0.15 m thickness, arising some hours after short period tropical shower. The spatial and temporal scale of these fluctuations are: 50–100 m and 65–15 min respectively.

The diagnostics of "relic rain" phenomenon can be made with claimed method by measuring the brightness temperature of upwelling microwave radiation of ocean-atmosphere system from aboard of drifted ship.

FIG. 2 shows the synchronous realizations of brightness temperature $T_b$ of upwelling microwave radiation of ocean-atmosphere system at frequencies of 34.5, 37.5 48.0 GHz (vertical polarization) and 34.5, 48.0 GHz (horizontal polarization) on Oct. 17, 1984, from 16.30 to 24.00 of local time. The measurements have been carried out in South-China Sea at geographic point of 12.5° N, and 113.5°E, in 18-th voyage of "Professor Bogorov" research vessel of Russian Academy of Sciences. FIG. 2 shows the brightness temperature variations due to both the short period tropical shower (region A) and "relic rain" (region B). The brightness temperature relative scale $\Delta T_b$ in Kelvin (K.) is shown at the upper right of FIG. 2.

It is significant that the shower gives rise to increasing of brightness temperature of upwelling microwave radiation of ocean-atmosphere system at all operating frequencies and polarizations at one time (FIG. 2, region A), while the "relic rain" anomalous phenomenon causes the brightness temperature variations only at individual operating frequencies and polarizations (FIG. 2, region B).

EXAMPLES

1. The diagnostics of anomalous phenomenon in the ocean-atmosphere system caused, for instance, by "relic rain" can be performed with the claimed method as follows (FIG. 2, region B). The brightness temperature of upwelling microwave radiation of ocean-atmosphere system is measured at frequencies in the range, approximately, from 20 to 100 GHz. Measurements are simultaneously made at least two operating frequencies, for instance, of 34.5 GHz and 37.5 GHz. Spectral interval between mentioned above operating frequencies is equal to 8% from operating frequency of 37.5 GHz. The microwave radiation is received at viewing angles between 73° and 77°, which is determined by the finite width of receiving antenna diagram. In such a manner the temporal realizations of brightness temperature of upwelling microwave radiation of ocean-atmosphere system are obtained, at least, two indicated operating frequencies in the mentioned above range (FIG. 2, curves b and c). Obtained data are analyzed for the presence, at least, one type of specific spectral changes of brightness temperature of upwelling microwave radiation of ocean-atmosphere system, which are characterized by the brightness temperature changes at least one operating frequency, for instance, 34.5 GHz (FIG. 2, curve c, region B), concurrently with the absence of indicated brightness temperature changes at least one of other operating frequencies, for instance, 37.5 GHz (FIG. 2, curve b, region B). With the availability of brightness temperature spectral changes under discussion, the anomalous phenomenon area is classified on the ocean surface.

2. The diagnostics of anomalous phenomenon in the ocean-atmosphere system caused, for instance, by "relic rain" can be performed with the claimed method as follows (FIG. 2, region B). The brightness temperature of upwelling microwave radiation of ocean-atmosphere system is measured at frequencies in the range, approximately, from 20 to 100 GHz. Measurements are simultaneously made at least two operating frequencies, for instance, 34.5 GHz and 48.0 GHz. Spectral interval between mentioned above operating frequencies is equal to 28% from operating frequency of 48.0 GHz. The microwave radiation is received at viewing angles between 73° and 77°, which is determined by the finite width of receiving antenna diagram. In such a manner the temporal realizations of brightness temperature of upwelling microwave radiation of ocean-atmosphere system are obtained, at least, two indicated operating frequencies in the mentioned above range (FIG. 2, curves a and e). Obtained data are analyzed for the presence, at least, one type of specific spectral changes of brightness temperature of upwelling microwave radiation of ocean-atmosphere system, which are characterized by the increasing of brightness temperature level, at least one operating frequency, for instance, 34.5 GHz (FIG. 2, curve e, interval CD), concurrently with the decreasing of brightness temperature level, at least one of other operating frequencies in the mentioned above range, for instance, 48.0 GHz (FIG. 2, curve a, interval CD). With the availability of brightness temperature spectral changes under discussion, the anomalous phenomenon area is classified on the ocean surface.

3. The diagnostics of anomalous phenomenon in the ocean-atmosphere system caused, for instance, by "relic rain" can be performed with the claimed method as follows (FIG. 2, region B). The brightness temperature of upwelling microwave radiation of ocean-atmosphere system is measured at frequencies in the range, approximately, from 20 to 100 GHz. Measurements are simultaneously made at two orthogonal polarizations for each operating frequency, for instance, 48.0 GHz. The microwave radiation is received at viewing angles between 74° and 76°, which are determined by the finite width of receiving antenna diagram. In such a manner the temporal realizations of brightness temperature of upwelling microwave radiation of ocean-atmosphere system are simultaneously obtained at two orthogonal polarizations for the same operating frequency, for instance, 48.0 GHz (FIG. 2, curves a and d). Obtained data are analyzed for the presence, at least, one type of specific polarization changes of brightness temperature of upwelling microwave radiation of ocean-atmosphere system, which are characterized by the brightness temperature changes at one given polarization, for instance, vertical polarization (FIG. 2, curve a, region, B), concurrently with the absence of indicated brightness temperature changes at another polarization, for instance, horizontal polarization (FIG. 2, curve d, region B) for the same operating frequency. With the availability of brightness temperature polarization changes under discussion, the anomalous phenomenon area is classified on the ocean surface.

4. The diagnostics of anomalous phenomenon in the ocean-atmosphere system caused, for instance, by "relic rain" can be performed with the claimed method as follows (FIG. 2, region B). The brightness temperature of upwelling microwave radiation of ocean-atmosphere system is measured at frequencies in the range, approximately, from 20 to 100 GHz. Measurements are simultaneously made at two orthogonal polarizations for each operating frequency, for instance, 34.5 GHz. The microwave radiation is received at viewing angles between 73° and 77°, which are determined by the finite width of receiving antenna diagram. In such a manner the temporal realizations of brightness temperature of upwelling microwave radiation of ocean-atmosphere system are simultaneously obtained at two orthogonal polarizations for the same operating frequency, for instance, 34.5 GHz (FIG. 2, curve c and e). Obtained data are analyzed for the presence, at least, one type of specific polarization changes of brightness temperature of upwelling microwave radiation of ocean-atmosphere system, which are characterized by the decreasing of brightness temperature level at one given polarization, for instance, vertical polarization (FIG. 2, curve c, interval CD), concurrently with the increasing of brightness temperature level at another polarization, for instance, horizontal polarization (FIG. 2, curve e, interval CD) for the same operating frequency. With the availability of brightness temperature polarization changes under discussion, the anomalous phenomenon area is classified on the ocean surface.

The claimed method for remote diagnostics of the ocean-atmosphere system state makes it possible: to classify the location of oceanic synoptical eddies, including deep one; to determine the size and position of oceanic frontal zones; to determine the anomalous state of the ocean surface the day before tropical cyclones origination and, thus, to predict the places of their formation; to classify the anomalous state of the ocean surface in the neighborhood of typhoons and hurricanes which would enable estimating their trajectories; to classify the stages of development of anomalous oceanic phenomena line El-Nino, influencing on global weather and climate changes.

Figure 3:
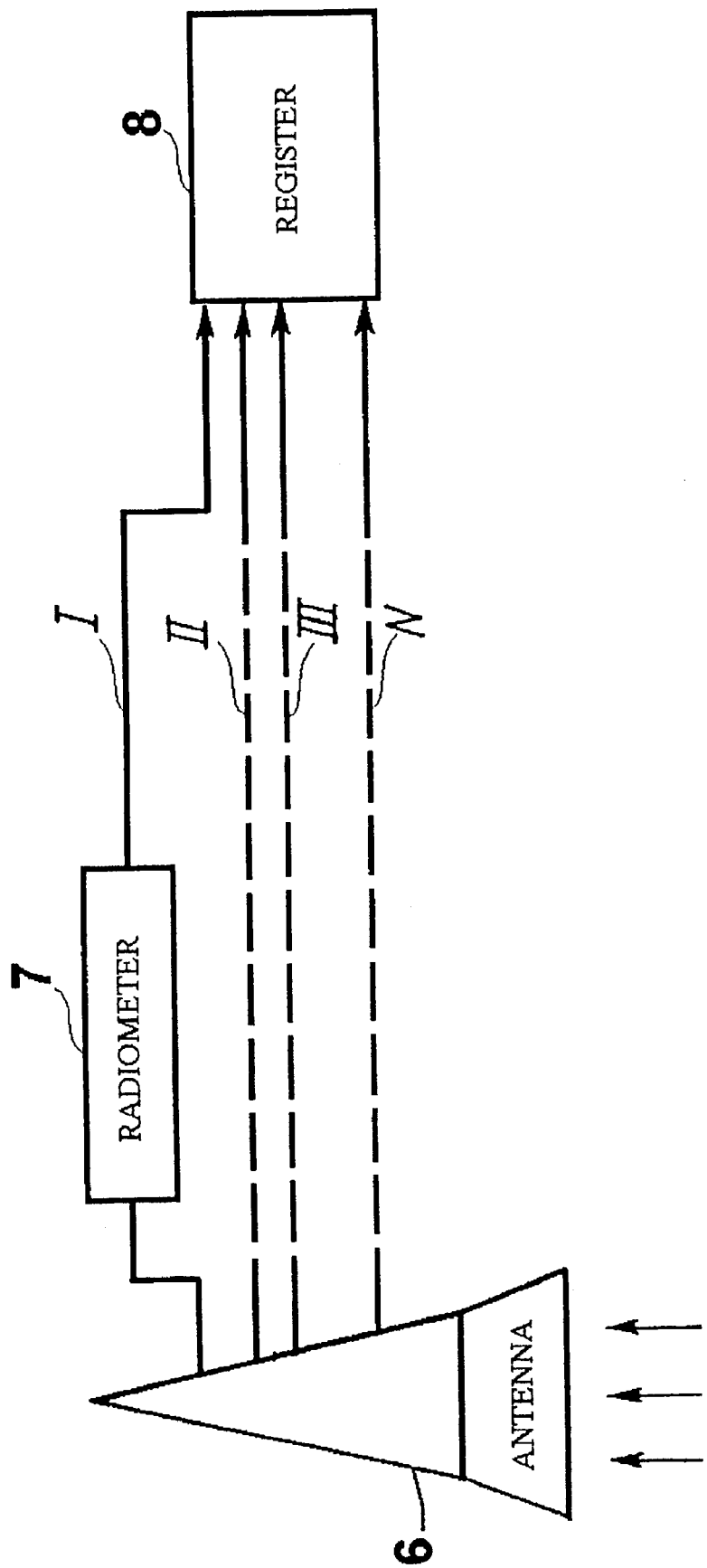
FIG. 3.—shows the block-diagram of device for remote diagnostics of ocean-atmosphere system state, according to subject invention.

A device for remote diagnostics of ocean-atmosphere system state contains a receiving antenna 6 (FIG. 3) to which the radiometers 7 are connected and tuned to operating frequencies in the range, approximately, from 20 to 100 GHz, whereby the brightness temperature of upwelling microwave radiation of ocean-atmosphere system is measured. Since the brightness temperature of upwelling microwave radiation of ocean-atmosphere system is measured on two orthogonal polarization, the number of radiometers is equal to twice number of operating frequencies. The optimum number of radiometers I, II, . . . N is defined the demands of providing the most reliable information on ocean-atmosphere system state. As this takes place, the minimum of their number must be equal to no less than two radiometers, but the maximum number is not limited.

The output of each radiometer 7 is connected to data register 8 built around computer, which provides the data acquisition, preliminary processing and their record for further analysis.

The mentioned above block-diagram operates as follows. The upwelling microwave radiation of ocean-atmosphere system is received by, for instance, multi-frequency horn antenna 6. The received radiation over a wide range of frequencies is deparated into frequencies and polarizations by means of antenna, and arrives at radiometers I, II, . . . , N. Each raidometer 7 measures the brightness temperature of upwelling microwave radiation of ocean-atmosphere system at appropriate frequency. The radiometers 7 comprise well-known high-sensitivity receivers of microwave radiation with the sensitivity of order of 0.05–0.5 K. at integration time 1s.

Output signal of each radiometer 7 in the form of direct current voltage, which characterized the magnitude of brightness temperature of upwelling microwave radiation of ocean-atmosphere system at the antenna 6 input, arrives at register 8. Here, the signal passes through analog-to-digital converter and inputs into computer for specific processing.

Data processing includes the analysis of information from various radiometers. The methods of obtaining the useful information are discussed above in examples 1–4.

It is understood that the presents examples and embodiments are to be considered as illustrative and not restrictive and the invention is not to be limited to the details given herein, but may be modified within the scope of appended claims.

I claim:

1. A method for remote diagnostics of an ocean-atmosphere system state comprising the steps of:
concurrently measuring the upwelling microwave radiation of an ocean-atmosphere system at two operating frequencies, said operating frequencies being in the waveband between 20 GHz and 100 GHz and having a spectral interval within a range of 5% to 30%, said measuring using a viewing angle with respect to an ocean surface being in a range of 60 degrees to 80 degrees;
obtaining the brightness temperature of said upwelling microwave radiation of the ocean-atmosphere at at least said two operating frequencies in the waveband; and
determining specific spectral variations of the brightness temperature of the said upwelling microwave radiation of the ocean atmosphere system at said two operating frequencies on the waveband to classify the ocean-atmosphere system state.

2. A method according to claim 1,
wherein the measuring of said brightness temperature of upwelling microwave radiation of the ocean-atmosphere system in said waveband include measuring of said brightness temperature concurrently for both vertical and horizontal polarization for each operating frequency.

3. A method according to claim 1,
wherein said determining comprises the step of determining at least one type of said specific spectral variations of said brightness temperature of upwelling microwave radiation of the ocean-atmosphere system comprising the variations of said brightness temperature at one of said operating frequencies concurrently in the absence of any variation of said brightness temperature at another of said operating frequencies in the waveband to classify areas of anomalous processes at the ocean surface.

4. A method according to claim 3, further comprising the step of
providing the monitoring of said spatial areas at the ocean surface to determine the size and geographic location of said anomalous processes in the ocean-atmosphere system.

5. A method according to claim 1,
wherein said determining comprises the step of determining at least one type of said specific spectral variations of said brightness temperature of upwelling microwave radiation of the ocean-atmosphere system comprising the increase of said brightness temperature at one said operating frequency at least concurrently with a decreasing of said brightness temperature at one of the other of said operating frequencies at least in said waveband to classify areas of anomalous processes at the ocean surface.

6. A method according to claim 5, further comprising the step of
providing the monitoring of said spatial areas at the ocean surface to determine the size and geographic location of said anomalous processes in the ocean-atmosphere system.

7. A method according to claim 2,
wherein said determining comprises the step of determining at least one type of said specific spectral variations of said brightness temperature of upwelling microwave radiation of the ocean-atmosphere system at one operating frequency comprising the variations of said brightness temperature for one polarization concurrently with the absence of any variation of said brightness temperature for another polarization for the same said operating frequency in said waveband to classify areas of anomalous processes at the ocean surface.

8. A method according to claim 7, further comprising the step of
providing the monitoring of said spatial areas at the ocean surface to determine the size and geographic location of said anomalous processes in the ocean-atmosphere system.

9. A method according to claim 2,
wherein said determining comprises the step of determining at least one type of said specific spectral variations of said brightness temperature of upwelling microwave radiation of the ocean-atmosphere system at one said operating frequency at least comprising the increase of said brightness temperature for one polarization concurrently with decreasing said brightness temperature for another polarization for the same said operating frequency in said waveband to classify areas of anomalous processes at the ocean surface.

10. A method according to claim 9, further comprising the step of providing the monitoring of said spatial areas at the ocean surface to determine the size and geographic location of said anomalous processes in the ocean-atmosphere system.

11. A device for remote diagnostics of the ocean-atmosphere system state, comprising:

an antenna for receiving upwelling microwave radiation of an ocean-atmosphere system wherein said antenna is directed to an ocean surface at an incident angle within the range of 60° to 80°;

radiometers connected with said antenna for measuring a brightness temperature of said upwelling microwave radiation of the ocean-atmosphere system for both vertical and horizontal polarization said radiometers tuned at two operating frequencies at least in a waveband between 20 GHz and 100 GHz, with a spectral interval between said two operating frequencies being in the range of 5% to 30% of the operating frequency value in said waveband; and a register connected with outputs of said radiometers and provided for processing of signals obtained from said radiometers to classify the ocean-atmosphere system state.

* * * * *